US009580813B2

(12) United States Patent
Vonk et al.

(10) Patent No.: US 9,580,813 B2
(45) Date of Patent: Feb. 28, 2017

(54) METAL PRETREATMENT COMPOSITION CONTAINING ZIRCONIUM, COPPER, AND METAL CHELATING AGENTS AND RELATED COATINGS ON METAL SUBSTRATES

(71) Applicant: Henkel AG & Co. KGaA, Duesseldorf (DE)

(72) Inventors: Donald R. Vonk, Clinton Township, MI (US); Edis Kapic, Sterling Heights, MI (US); Michael L. Sienkowski, Warren, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/015,523

(22) Filed: Feb. 4, 2016

(65) Prior Publication Data

US 2016/0153093 A1 Jun. 2, 2016

Related U.S. Application Data

(60) Division of application No. 13/796,585, filed on Mar. 12, 2013, now Pat. No. 9,284,460, and a continuation of application No. PCT/US2011/063789, filed on Dec. 7, 2011.

(60) Provisional application No. 61/420,509, filed on Dec. 7, 2010.

(51) Int. Cl.
| | |
|---|---|
| *C23C 22/34* | (2006.01) |
| *C23C 22/60* | (2006.01) |
| *C23C 22/68* | (2006.01) |
| *C23C 22/78* | (2006.01) |
| *C23C 22/83* | (2006.01) |
| *C09D 7/12* | (2006.01) |
| *B05D 1/36* | (2006.01) |
| *B05D 3/00* | (2006.01) |

(52) U.S. Cl.
CPC ............. *C23C 22/34* (2013.01); *B05D 1/36* (2013.01); *B05D 3/002* (2013.01); *C09D 7/1208* (2013.01); *C23C 22/78* (2013.01); *C23C 22/83* (2013.01); *Y10T 428/12778* (2015.01)

(58) Field of Classification Search
CPC ......... C23C 22/34; C23C 22/60; C23C 22/68; C23C 22/78; C23C 22/83; C09D 7/1208; B05D 1/36; B05D 3/002

USPC ............ 106/1.12, 1.13, 14.13, 14.14, 14.21; 148/247; 427/405, 328; 428/660

See application file for complete search history.

(56) References Cited

U.S. PATENT DOCUMENTS

| | | |
|---|---|---|
| 5,427,632 A | 6/1995 | Dolan |
| 5,964,928 A | 10/1999 | Tomlinson |
| 6,558,480 B1 | 5/2003 | Rochfort et al. |
| 6,749,694 B2 | 6/2004 | Greene et al. |
| 7,063,735 B2 | 6/2006 | Fristad et al. |
| 7,510,612 B2 | 3/2009 | Matsukawa et al. |
| 9,284,460 B2 * | 3/2016 | Vonk .................... C09D 7/1208 |
| 2003/0096893 A1 | 5/2003 | Boomgaard et al. |
| 2004/0163736 A1 | 8/2004 | Matsukawa et al. |
| 2004/0187967 A1 | 9/2004 | Matsukawa et al. |
| 2005/0067057 A1 | 3/2005 | Ishikura et al. |
| 2007/0017602 A1 | 1/2007 | Koch et al. |
| 2008/0302448 A1 | 12/2008 | Frey et al. |
| 2009/0032144 A1 | 2/2009 | McMillen et al. |
| 2010/0015467 A1 | 1/2010 | Zimmermann et al. |
| 2011/0041957 A1 | 2/2011 | Brouwer et al. |
| 2011/0094630 A1 | 4/2011 | Yoshida et al. |
| 2012/0301739 A1 | 11/2012 | Vonk et al. |

FOREIGN PATENT DOCUMENTS

| | | |
|---|---|---|
| CN | 1128053 | 7/1996 |
| CN | 1325461 | 12/2001 |
| WO | 2009-115504 | 9/2009 |

OTHER PUBLICATIONS

International Search Report for PCT/US2011/063789 dated Jul. 2, 2012, 4 pages.

* cited by examiner

Primary Examiner — Helene Klemanski
(74) Attorney, Agent, or Firm — Mary K. Cameron

(57) ABSTRACT

Disclosed is a zirconium-based metal pretreatment coating composition that includes a metal chelator that chelates copper in the metal pretreatment coating composition and thereby improves adhesion of paints to a metal substrate coated with the pretreatment coating composition and the chelating agent is present in a sufficient amount to ensure that in the deposited pretreatment coating on the metal substrate the average total atomic % of copper to atomic % of zirconium is equal to or less than 1.1. The pretreatment coating composition is useful for treating a variety of metal substrates.

15 Claims, 5 Drawing Sheets

SEM　　　　　Analysis Points

SEM　　　　　Analysis Points

METAL PRETREATMENT COMPOSITION CONTAINING ZIRCONIUM, COPPER, AND METAL CHELATING AGENTS AND RELATED COATINGS ON METAL SUBSTRATES

RELATED APPLICATIONS

This application is a divisional of U.S. patent application Ser. No. 13/796,585, filed Mar. 12, 2013 now U.S. Pat. No. 9,284,460, which is a continuation of PCT/US2011/063789, filed Dec. 7, 2011, which claims priority to U.S. Provisional Patent Application No. 61/420,509, filed Dec. 7, 2010, which applications are hereby incorporated herein by reference in its entirety.

TECHNICAL FIELD

This invention relates generally to coating compositions, in particular, coating compositions that can be applied to metal substrates to enhance paint adhesion even after extended coating times. The invention also relates to the coatings obtained from the coating composition, methods of applying these coatings and the coated substrate.

BACKGROUND OF THE INVENTION

A pretreatment coating is often applied to metal substrates, especially metal substrates that contain iron such as steel, prior to the application of a protective or decorative coating. The pretreatment coating minimizes the amount of corrosion to the metal substrate. In addition, the pretreatment coating can affect the adhesion of subsequently applied decorative coatings such as paints and clear coats. Many of the present pretreatment coating compositions are based on metal phosphates, and/or rely on a chrome-containing rinse. The metal phosphates and chrome rinse solutions produce waste streams that are detrimental to the environment. As a result, there is the ever-increasing cost associated with their disposal. There is an interest to develop pretreatment coating compositions and methods of applying such compositions without producing metal phosphate and chrome waste solutions. It is also preferred, that these pretreatment coating compositions be effective in minimizing corrosion and enhancing decorative coating adhesion on a variety of metal substrates because many objects of commercial interest contain more than one type of metal substrate. For example, the automobile industry often relies on metal components that contain more than one type of metal substrate. The use of a coating composition effective for more than one metal substrate would provide a more streamlined manufacturing process.

The coating compositions of the present invention are called pretreatment coatings because they are typically applied after the substrate has been cleaned and before the various primer and decorative coatings have been applied. In the automotive industry, coatings often comprise the following layers in order from the substrate out: a pretreatment coating for corrosion resistance, an electrodeposited electrocoat, then a primer layer, a base coat paint, and then a top clear coat. In the present application, all coatings after the pretreatment coating are considered as paints unless otherwise noted. One known pretreatment coating is Bonderite® 958 available from Henkel Adhesive Technologies. The Bonderite® 958 provides a zinc-phosphate based conversion coating composition that includes zinc, nickel, manganese and phosphate. Currently, Bonderite® 958 is a standard conversion coating used extensively in the automotive industry.

In attempts to move away from conversion coatings that include heavy metals, which as used herein will be understood by those in the conversion coating arts to mean zinc, nickel, cobalt, manganese, and chromium, or that produce phosphate waste streams, a new class of environmentally friendly conversion coating compositions has been created. The new class of coatings generally comprises a zirconium-based conversion coating deposited on a metal substrate by contact with a working bath containing dissolved zirconium in the coating compositions. These conversion coating compositions, which are based on a zirconium coating technology, typically have no phosphates and no nickel or manganese. Zirconium-based coatings are finding increasing use in the automotive industry as a pretreatment coating.

Manufacturing plants' metal coating assembly lines are part of an overall process that is highly coordinated and carefully timed. Metal workpieces are cut to size, formed, cleaned, coated with a pretreatment coating, and then coated with several over layers. Several different types of metal may pass separately through parts of the process to be joined to each other in one step and then proceed through the remaining process steps as an assembly of dissimilar metals. These processes are carried out on hundreds of pieces per hour and the system requires precise movement of a metal workpiece through the process. From time to time, the processing line may be halted, sometimes unexpectedly due to a problem in one of the processes in the assembly line. When line stoppage occurs, workpieces are held in the various stages of the line for far longer than is desirable. When a workpiece is held in a pretreatment bath too long it is often found that the coated workpiece does not perform up to required standards. For example, the coated workpieces may not exhibit the desired corrosion resistance or paint adhesion characteristics. This can lead to increased scrap rates and potential recalls, which can drive up costs of manufacturing. Thus, it is desirable to provide a pretreatment coating composition that has a longer pot life, meaning that a metal workpiece can be immersed in the bath for a longer period of time without a decrease in the performance of the coated metal workpiece in corrosion resistance or paint adhesion.

It is also desirable to provide increasing functionality in terms of enhanced corrosion protection and improved paint adhesion in pretreatment coatings to a wide range of metal substrates. At the same time, these improvements preferably do not require changes to existing industrial processes or the equipment used on these processing lines.

Many zirconium-based conversion coating baths contain copper, either as an additive to improve features of the pretreatment coating and/or process or as a trace element from water or metal workpieces being coated. Regardless of its source, the present inventors have discovered that copper from the zirconium-based coating bath that is deposited in the pretreatment coating at too high an amount relative to other coating components can negatively affect performance of the coated metal substrate. Accordingly, it is desirable to develop zirconium-based coating baths that overcome this deficiency.

SUMMARY OF THE INVENTION

In general terms, this invention provides a metal pretreatment coating that is zirconium-based and that provides a longer pot life and enhanced paint adhesion without decreasing the corrosion resistance. The invention also relates to the coatings and coated substrate obtained from the coating composition.

In one embodiment, a zirconium-based metal pretreatment coating composition comprising water and dissolved Zr, a source of fluoride, a copper chelating agent, optionally materials comprising one or more of silicon, boron and yttrium and optional added dissolved Cu is provided. Desirably, the zirconium-based metal pretreatment coating composition said copper chelating agent is capable of reducing amounts of copper deposited in a zirconium based coating on a metal substrate by contact with the zirconium based metal pretreatment coating composition, said copper chelating agent present in an amount sufficient to thereby produce an average total ratio of atomic % of Cu to atomic % of Zr in said coating deposited on the metal substrate that is equal to or less than 1.1.

In one embodiment, a zirconium-based metal pretreatment coating composition is provided, comprising:
A.) 50 to 300 ppm of said dissolved Zr,
B.) 0 to 50 ppm of said added dissolved Cu,
C.) 0 to 100 ppm of SiO2,
D.) 150 to 2000 ppm of total Fluoride,
E.) 10 to 100 ppm of free Fluoride and
F.) at least 10 ppm of said copper chelating agent.

In one embodiment, the added dissolved Cu is present in the coating composition and the copper chelating agent is present in an amount of 25 to 1500 ppm.

In one embodiment, the copper chelating agent is selected from molecules having multiple carboxylic and/or phosphonic functional groups. Desirably the copper chelating agent is selected from the group consisting of aminosalicylic acid, ascorbic acid, aspartic acid, benzoic acid, citric acid, cyanuric acid, diethylenetriamine-pentamethylene phosphonic acid, dihydroxybenzoic acid, dimethylenetriaminepentaacetic acid, ethylenediaminetetraacetic acid, gluconic acid, glutamic acid, hydroxyacetic acid, hydroxyethylidene diphosphonic acid, hydroxyglutamic acid, iminosuccinic acid, kojic acid, lactic acid, malonic acid, nitrilotriacetic acid, nitrobenzenesulfonic acid, nitrosalicylic acid, oxalic acid, polyacrylic acid, polyaspartic acid, salicylic acid, tartaric acid, and salts of said acids.

In one embodiment, the zirconium-based metal pretreatment coating composition described above has a copper chelating agent comprising tartaric acid and/or salts thereof.

Another aspect of the invention is a method for improving paint adhesion to a metal substrate comprising the steps of:
a) optionally cleaning a metal substrate;
b) applying to the metal substrate a zirconium-based metal pretreatment coating composition according to any one of the preceding claims, thereby forming a pretreatment coating on the metal substrate;
wherein the copper chelating agent is present in said zirconium-based metal pretreatment coating composition in an amount sufficient to result in an average total ratio of atomic % of Cu to atomic % of Zr in the pretreatment coating deposited on the metal substrate is equal to or less than 1.1; and
c) applying a paint to the metal pretreatment coated metal substrate.

Another aspect of the invention is a method for improving paint adhesion to a metal substrate that is subjected to a pretreatment with a zirconium-based pretreatment coating composition comprising the steps of:
a) contacting a metal substrate with a pre-rinse comprising a copper chelating agent, and optionally copper, prior to application of a zirconium-based pretreatment coating composition to the metal substrate;
b) applying to the metal substrate a zirconium-based metal pretreatment coating composition comprising dissolved Zr, a source of fluoride, optionally materials comprising one or more of silicon, boron and yttrium and optional added dissolved Cu, thereby forming a pretreatment coating on the metal substrate;
wherein the copper chelating agent is present in the pre-rinse in an amount sufficient to control the amount of copper deposited onto the metal substrate by the zirconium-based pretreatment coating composition such that the average total ratio of atomic % of Cu to atomic % of Zr in the pretreatment coating deposited on the metal substrate is equal to or less than 1.1.

In one embodiment, the copper chelating agent is present in an amount of at least 10 ppm and at most 2000 ppm.

Another aspect of the invention is an article of manufacture comprising a coated metal substrate comprising: a metal substrate; and deposited on said metal substrate, a pretreatment coating comprising metal from said substrate, zirconium, oxygen, copper, and optional elements fluorine and carbon; wherein the pretreatment coating on the metal substrate has an average total ratio of atomic % of Cu to atomic % of Zr that is equal to or less than 1.1.

In one embodiment, the article of manufacture is provided wherein average total ratio of atomic % of Cu to atomic % of Zr in the pretreatment coating on the metal substrate is about 0.9 to 0.02.

In one embodiment, the article of manufacture is provided wherein atomic % of Cu in said pretreatment coating measured at a series of depths from an outer surface of the pretreatment coating to the metal substrate does not exceed 33 atomic % Cu at any of said depths.

In one embodiment, the article of manufacture is provided further comprising at least one paint applied to the pretreatment coating resulting in a painted coated substrate that achieves at least 95% paint remaining when tested according to ASTM 3330M (Revised Oct. 1, 2004).

In one embodiment, the article of manufacture is provided further comprising at least one paint applied to the pretreatment coating resulting in a painted coated substrate that achieves 1.9 mm or less average corrosion creep when tested according to ASTM B117 (Revised Dec. 15, 2007) for 500 hours.

In one embodiment, the invention is directed to an aqueous metal pretreatment coating composition comprising: 50 to 300 ppm of dissolved Zr, 0 to 50 ppm of dissolved Cu, 0 to 100 ppm of $SiO_2$, 150 to 2000 ppm of total Fluoride, 10 to 100 ppm of free Fluoride and a chelating agent.

In one embodiment, the zirconium-based pretreatment coating composition of the invention provides a pretreatment coating wherein the average total ratio of atomic % of Cu to atomic % of Zr in the pretreatment coating on the metal substrate is less than 1.1. In a further embodiment, this ratio ranges downward from, in order of increasing preference 1.10, 1.05, 1.0, 0.95, 0.90, 0.85, 0.80, 0.75, 0.70, 0.65, 0.60, 0.55, 0.50 and is not less than, in increasing order of preference 0.0001, 0.0005, 0.0010, 0.0050, 0.010, 0.050. In certain embodiments, for example where no added Cu is present in the coating composition, the ratio of Cu to Zr in the deposited coating may be zero.

In another embodiment, the invention is directed to a method for improving paint adhesion to a metal substrate comprising the steps of: providing a metal substrate; applying to the metal substrate an aqueous, zirconium-based metal pretreatment coating composition comprising 50 to 300 ppm of dissolved Zr, 0 to 50 ppm of dissolved Cu, 0 to 100 ppm of $SiO_2$, 150 to 2000 ppm of total Fluoride, 10 to 100 ppm of free Fluoride and a chelating agent thereby forming a pretreatment coating on the metal substrate wherein a chelating agent is present in an amount such that the average total ratio of atomic % of Cu to atomic % of Zr in the pretreatment coating on the metal substrate is equal to or less than 1.1; and applying a paint to the metal pretreatment coated metal substrate.

The pretreatment coating can be used on a variety of metal substrates including cold rolled steel (CRS), hot-rolled steel, stainless steel, steel coated with zinc metal, zinc alloys such as electrogalvanized steel (EG), 55% Aluminum-Zinc alloy coated sheet steel, such as Galvalume®, galvanneal (steel sheet with a fully alloyed iron-zinc coating) (HIA), and hot-dipped galvanized steel (HDG), aluminum alloys such as AL6111 and aluminum plated steel substrates. One advantage the invention offers is that components containing more than one type of metal substrate can be passivated in a single process because of the broad range of metal substrates that can be passivated by the pretreatment coating compositions of the invention.

In another embodiment, the invention is directed to a coated substrate comprising a metal substrate having deposited on said metal a pretreatment coating comprising metal from the substrate, zirconium, oxygen, copper and optional elements fluorine and carbon; wherein average total ratio of atomic % of Cu to atomic % of Zr in the pretreatment coating on the metal substrate is equal to or less than 1.1. In one embodiment, the coated substrate further comprises at least one paint applied to the pretreatment coating wherein the painted coated substrate achieves at least 95% paint remaining when tested according to ASTM 3330M (Revised Oct. 1, 2004).

These and other features and advantages of this invention will become more apparent to those skilled in the art from the detailed description of a preferred embodiment. Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, throughout this description, unless expressly stated to the contrary: percent, "parts of", and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ by chemical reactions specified in the description, and does not necessarily preclude other chemical interactions among the constituents of a mixture once mixed; specification of materials in ionic form additionally implies the presence of sufficient counter ions to produce electrical neutrality for the composition as a whole (any counter ions thus implicitly specified should preferably be selected from among other constituents explicitly specified in ionic form, to the extent possible; otherwise such counter ions may be freely selected, except for avoiding counter ions that act adversely to the objects of the invention); the term "paint" includes all like materials that may be designated by more specialized terms such as primer, lacquer, enamel, varnish, shellac, topcoat, and the like; and the term "mole" and its variations may be applied to elemental, ionic, and any other chemical species defined by number and type of atoms present, as well as to compounds with well defined molecules.

BRIEF DESCRIPTION OF THE DRAWINGS

The drawings that accompany the detailed description are described below.

DETAILED DESCRIPTION OF A PREFERRED EMBODIMENT

Figure 1:
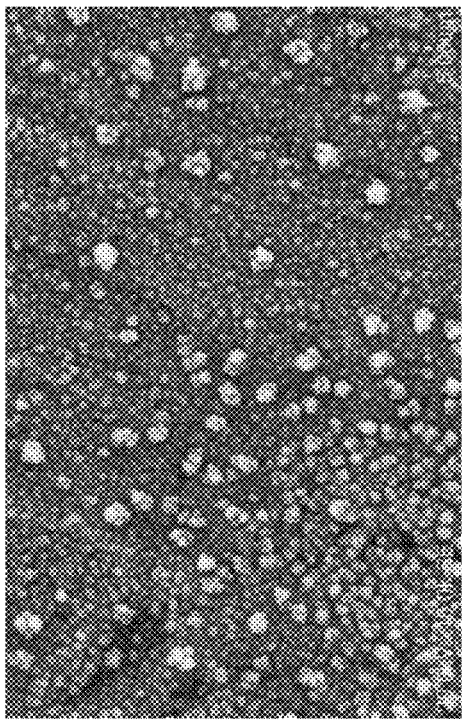
FIGS. 1A, 1B, 1C, and 1D are scanning electron microscope (SEM) images of pretreatment coatings on cold rolled steel.
Figure 1:
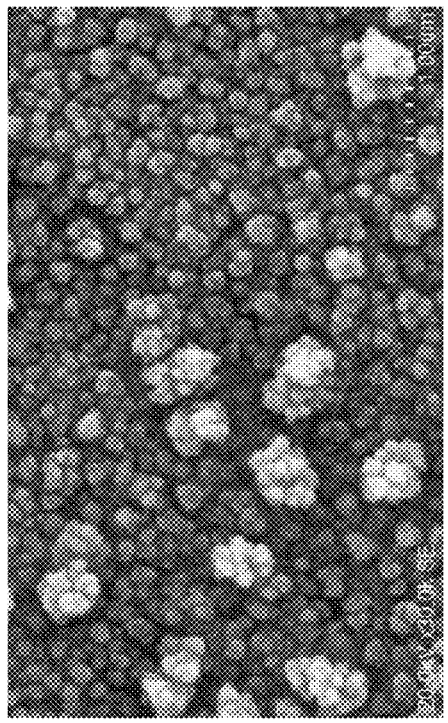
Figure 1:
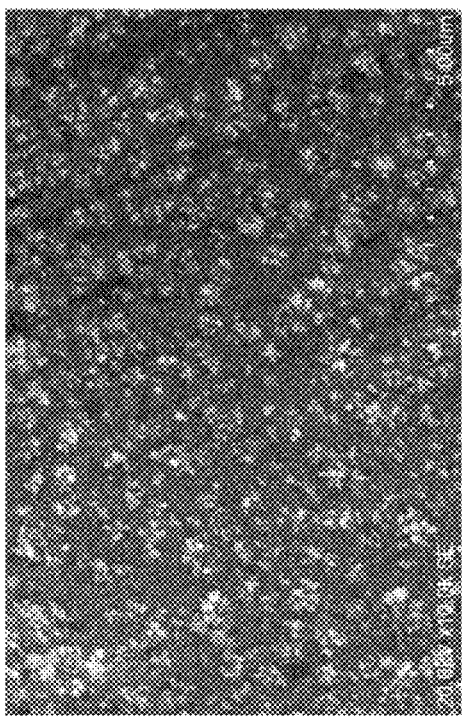
Figure 1:

The present invention is directed to a metal pretreatment coating composition, and a method for applying the same, as well as to articles of manufacture comprising coatings according to the invention. The invention provides surprising improvements in performance in zirconium-based conversion coating pretreatments such as, by way of non-limiting example, zirconium-based conversion coatings deposited on a metal substrate by contact with a working bath containing dissolved zirconium in the coating compositions. These conversion coating compositions are exemplified by aqueous coating baths comprising dissolved zirconium and free fluoride that form coatings comprising zirconium and oxygen. The baths are typically aqueous, neutral to acidic, and comprise dissolved zirconium, dissolved copper, either as an additive or as a trace element from water or metal substrates, and a source of fluoride. Optional components may be present including materials comprising one or more of silicon (e.g. silica, silicates, silanes), boron, yttrium, particular embodiments of which have no phosphates and no zinc, nickel, cobalt, manganese, and chromium.

Many zirconium-based coating baths contain copper, either as an additive or as a trace element from water or from metal workpieces being coated. Regardless of its source, the present inventors have discovered that copper from the zirconium-based coating bath that is deposited in the coating can negatively affect performance of the coated metal substrate, if present in amounts such that undesirable morphologies in the coating arise and/or in amounts above desirable levels.

Many zirconium-based pretreatment coating compositions may benefit from the invention. The coating baths typically are aqueous, neutral to acidic, and comprise dissolved zirconium, dissolved copper, a source of fluoride and counter ions for the dissolved metals, for example sulfates and/or nitrates. Optional components may be present including materials comprising one or more of silicon (e.g. silica, silicates, silanes), boron, yttrium. The zirconium-based pretreatment coating compositions may contain acid, generally a mineral acid, but optionally organic acids; and/or an alkaline source. The acid and/or alkali may be a source of other components in the composition, may be used to control pH or both. The zirconium-based pretreatment coating compositions according to the invention may likewise, consist essentially of or consist of the materials described herein.

The coating composition according to the invention provides zirconium-based coatings having improved paint adhesion and maintained corrosion resistance. These and other benefits are achieved by adding to a zirconium-based coating composition, either a bath or the concentrate, a chelating agent, preferably a copper metal chelating agent, to control the amount of copper deposited onto the metal substrate by the zirconium-based pretreatment coating composition. This chelating agent can be added to the zirconium-based pretreatment coating composition even where no copper is present in the unused zirconium-based pretreatment coating composition, as a protective agent to prevent later copper deposition as the bath ages and copper is incorporated into the bath as a trace element from water, such as from prior cleaning or rinse steps, and/or from metal workpieces being coated. The inclusion of the chelating agent also extends the pot life of the pretreatment coating bath because is allows for a wider range of immersion times without negative effects on paint adhesion or corrosion protection.

In one embodiment of the invention, a zirconium-based pretreatment coating composition is provided comprising 50 to 300 ppm of dissolved Zr, 0 to 50 ppm of dissolved Cu, 0 to 100 ppm of $SiO_2$, 150 to 2000 ppm of total Fluoride, 10 to 100 ppm of free Fluoride and a chelating agent. That is, the composition may comprise amounts within the disclosed ranges, such as: 50, 60, 70, 80, 90, 100, 120, 130, 140 or 150 ppm to 160, 170, 180, 190, 200, 210, 220, 230, 240, 250, 260, 270, 280, 290 or 300 ppm of dissolved Zr; 0, 5, 10, 15, or 20 ppm to 25, 30, 35, 40, 45, or 50 ppm of dissolved Cu; 0, 5, 10, 15, 20, 25, 30, 35, 40, 45, or 50 ppm to 60, 65, 70, 75, 80, 85, 90, 95 or 100 ppm of $SiO_2$; 150, 170, 190, 200, 225, 250, 275, 300, 325, 350, 375, 400, 425, 450, 475, 500, 525, 550, 575, 600, 700, 800, 900, or 1000 ppm to 1150, 1170, 1190, 1200, 1225, 1250, 1275, 1300, 1325, 1350, 1375, 1400, 1425, 1450, 1475, 1500, 1525, 1550, 1575, 1600, 1700, 1800, 1900, or 2000 ppm of total Fluoride; 10, 15, 20, 25, 30, 35, 40, 45, or 50 ppm to 60, 65, 70, 75, 80, 85, 90, 95 or 100 ppm of free Fluoride and a chelating agent.

In another embodiment of the invention, a zirconium-based pretreatment coating composition is provided comprising 100 to 300 ppm of dissolved Zr, 0 to 50 ppm of dissolved Cu, 0, 25, 50, 75, 100, 200, 300, 400, 500, 600, 700, 800, 900, 1000 or 2000 ppm to 2500, 3000, 4000, 4500 or 5000 ppm of $SO_4$, 100 to 1600 ppm of total Fluoride, 10 to 200 ppm of free Fluoride and a chelating agent.

The chelating agent may be any chelating agent capable of reducing the amount of copper deposited in the zirconium based coating. The chelating agent may be a copper metal chelator. A partial list of exemplary chelating agents, many of which are molecules having multiple carboxylic and/or phosphonic functional groups, that can be used in the present invention includes the following: adenine, adenosine, alanine, aminosalicylic acid, ascorbate/ascrobic acid, aspartate/aspartic acid, benzoic acid, citrate/citric acid, cyanuric acid, cysteine, cuprizone, diethanolamine, diethylenetriamine, diethylenetriamine-pentamethylene phosphonic acid, dihydroxybenzoic acid, dimethylenediamine, dimethylenetriamine, dimethylenetriaminepentaacetate (DTPA), dimethylglycine, dimethylglyoxime, ethylenediaminetetraacetate (EDTA), ethyleneglycol, gluconate/gluconic acid, glutamate/glutamic acid, glycerol, glycine, guanine, guanosine, histadine, histamine, hydroxyacetic acid, hydroxyethylidene diphosphonic acid (HEDP), hydroxyglutamic acid, hydroxylamine, iminodisuccinate, kojic acid, lactate/lactic acid, leucine, malonic acid, mannitol, methylglycine, molybdate, nitrilotriacetate, nitrosalicylic acid, ornithine, oxalic acid, polyacrylates, polyaspartates, phenylalanine, salicylic acid, salicylaldoxime, sodium nitrite, sodium nitrobenzenesulfonate, tartrate/tartaric acid, triethanolamine (TEA), triethylenetriamine (TETA), tris(2-aminoethyl)amine (diethylenetriamine), or thioacetamide.

These chelating agents may be utilized according to the following methods: they may be incorporated into a pre-rinse applied prior to contacting the metal substrate with a zirconium-based pretreatment coating composition; the chelating agents may be incorporated into a zirconium-based pretreatment coating composition as discussed above; the chelating agents may also be applied as a post-rinse applied after the metal substrate has been contacted with a zirconium-based pretreatment coating composition.

The chelating agents are used a level sufficient to ensure that in the deposited pretreatment coating the average total ratio of the atomic % of Cu to the atomic % of Zr in the pretreatment coating on the metal substrate is equal to or less than 1.1, preferably from 0.9 to 0.02, and most preferably from 0.30 to 0.10.

The amount of chelating agent in the coating composition may range from 10 ppm to 2000 ppm. The amount required is affected by, for example, the amount of copper present in the coating composition, the temperature of the coating bath, the substrate being coated, whether the composition is a concentrate or the working bath and the particular chelating agent being used. Chelating agents with multiple coordination sites may be used at lower levels. In one embodiment the chelating agent is present in an amount ranging from 25-100 ppm in the coating bath. More chelating agent may be added provided the concentration does not adversely affect bath performance. Desirably, the amount of chelating agent in the pretreatment coating composition is an amount sufficient to achieve a desired Cu:Zr ratio in the deposited coating and preferably the chelating agent amount is at least, in increasing order of preference 10, 15, 20, 25, 30, 35, 40, 45, 50, 55, 60, 65, 70 or 75 ppm and is at most, in increasing order of preference, 2000, 1500, 1000, 900, 800, 700, 600, 500, 400, 300, 200, 100 ppm.

The average total ratio of atomic % of Cu to atomic % of Zr may range downward from, in order of increasing preference 1.10, 1.05, 1.0, 0.95, 0.90, 0.85, 0.80, 0.75, 0.70, 0.65, 0.60, 0.55, 0.50. For some zirconium-based pretreatment coating compositions, copper is a desirable part of the composition and the coating. For some such coating compositions, the ratio of copper to zirconium is desirably not less than, in increasing order of preference 0.0001, 0.0005, 0.0010, 0.0050, 0.010, 0.050.

Zirconium-based pretreatment coatings of the invention may have a variety of components in the coating provided that the amount of copper in the coating is not such that undesirable coating morphology and performance failures result.

EXAMPLES

In a standard industrial coating process, the immersion bath time for a pretreatment coating step is about 120 seconds, but during an assembly line stoppage this time can be 10 minutes or longer. To simulate a line stoppage and to test various parameters an alternative protocol was developed by the present inventors. The process used in the experiments described in the present specification is as shown in TABLE 1 below.

The standard pretreatment process for all of the data, unless otherwise noted, is as described below in TABLE 1. The Parco® Cleaner 1533R is an alkaline cleaner available from Henkel Adhesive Technologies. The Ridosol 1270 is a basic nonionic surfactant and is available from Henkel Adhesive Technologies. The weight ratio of Parco to Ridosol used was 8.33 to 1. Aging of the cleaner was simulated by adding the oil Tirroil 906 available from Tirreno Industries, to age the cleaner at 4 grams/liter. The base pretreatment composition was a zirconium-based pretreatment. The electrodeposited paint coating used in all of the paint adhesion tests was BASF Cathoguard 310X available from BASF. This is a standard coating used in the automotive industry.

TABLE 1

| Stage | Treatment | Product | Application | Time, seconds | Temp ° C. |
|---|---|---|---|---|---|
| 1 | Clean | Parco ® Cleaner 1533R/Ridosol 1270 fresh or aged | Spray | 70 | 60 |
| 2 | Clean | Parco ® Cleaner 1533R/Ridosol 1270 fresh or aged | Immersion | 150 | 60 |
| 3 | Rinse | City water | Spray | 60 | 28 |
| 4 | Rinse | Deionized water | Spray | 60 | 25 |
| 5 | Pretreatment | zirconium-based pretreatment bath | Immersion | 600 | 25 |
| 6 | Pretreatment | zirconium-based pretreatment bath | Spray | 30 | 25 |
| 7 | Rinse | Deionized water | Spray | 60 | 25 |
| 8 | Electrodeposited coating | BASF Cathoguard 310 X | immersion | 120 | 32 (230 V) |
| 9 | Rinse | Deionized water | Spray | 30 | 25 |
| 10 | Bake electrodeposited paint | | | 1200 | 350° F. or 375° F. |

Example 1

The zirconium-based pretreatment bath used for Example 1 included 180 parts per million (ppm) of zirconium, 30 ppm of copper, 35 ppm of free and 400 ppm of total fluoride, 42 ppm of $SiO_2$; the zirconium-based pretreatment bath pH was set at 4.2. Two different batches of commercially available, cold rolled steel (CRS 1 and CRS 2), as is typically used in automobile manufacture, were processed according to Table 1. The zirconium coating weight in milligrams Zr per square meter was determined for each sample.

In addition for each sample, the paint adhesion of the BASF Cathoguard 310 X was determined using the following protocol. A sample area was cross hatched down to the level of the substrate with a razor using a line spacing of 1 millimeter and 6 lines for each direction. Then a 75 millimeter long strip of adhesive tape 20 millimeters wide was applied to the cross hatched area. The tape adhesively bonds to steel according to ASTM 3330M (Revised Oct. 1, 2004) with a 180 degree peel strength value of 430 N/m. After 5 to 10 seconds of adhesion, the tail end of the tape was grasped and pulled upward with a rapid jerking motion perpendicular to the paint. The percent paint remaining attached to the substrate (indicative of paint adhesion) was determined as a percentage of the area covered by the tape. The results of Example 1 are reported below in TABLE 2.

TABLE 2

| Sample No. | CRS sample | Cleaner | Zr coating weight mg/m² | Bake temperature ° F. | % paint remaining |
|---|---|---|---|---|---|
| 1 | CRS 1 | 1533/1270 fresh | 143 | 350 | 100 |
| 2 | CRS 1 | 1533/1270 aged | 203 | 350 | 100 |
| 3 | CRS 1 | 1533/1270 fresh | 143 | 375 | 99-100 |
| 4 | CRS 1 | 1533/1270 aged | 203 | 375 | 100 |
| 5 | CRS 2 | 1533/1270 fresh | 165 | 350 | 95-98 |
| 6 | CRS 2 | 1533/1270 aged | 182 | 350 | 99-100 |
| 7 | CRS 2 | 1533/1270 fresh | 165 | 375 | 60-70 |
| 8 | CRS 2 | 1533/1270 aged | 182 | 375 | 80 |

The results demonstrated a bake temperature effect on the electrodeposited coating adhesion. When the bake temperature of the electrodeposited paint was raised from 350° F. to 375° F., there was a reduction in paint adhesion, especially on the CRS 2 substrate. The results for CRS 2 were also quite different than for CRS 1. Further examination of samples from each CRS revealed striking differences in the deposited pretreatment coating composition. FIGS. 1A and 1B are at a magnification of 10,000× and 1C and 1D are a magnification of 30,000×.

Sample 3:
FIGS. 1A and 1C are scanning electron microscope (SEM) photographs of CRS 1 coated with a pretreatment coating composition according to Example 1, using fresh 1533/1270, a Zr coating weight of 143 mg/m² and a bake temperature of 375° F. as described above (Sample 3).

Sample 7:
FIGS. 1B and 1D are SEM photographs of CRS 2 coated with a pretreatment coating according to Example 1, using fresh 1533/1270, a Zr coating weight of 165 mg/m² and a bake temperature of 375° F. as described above (Sample 7). Sample 7, the CRS 2 sample exhibited poor paint adhesion.

The photographs show that the deposited pretreatment coating of Sample 3 in FIGS. 1A and 1C was composed of much smaller substructures than that found in the pretreatment coating surface of Sample 7 in FIGS. 1B and 1D. The surface in FIGS. 1B and 1D had larger and more clumped looking substructures.

Figure 2A:
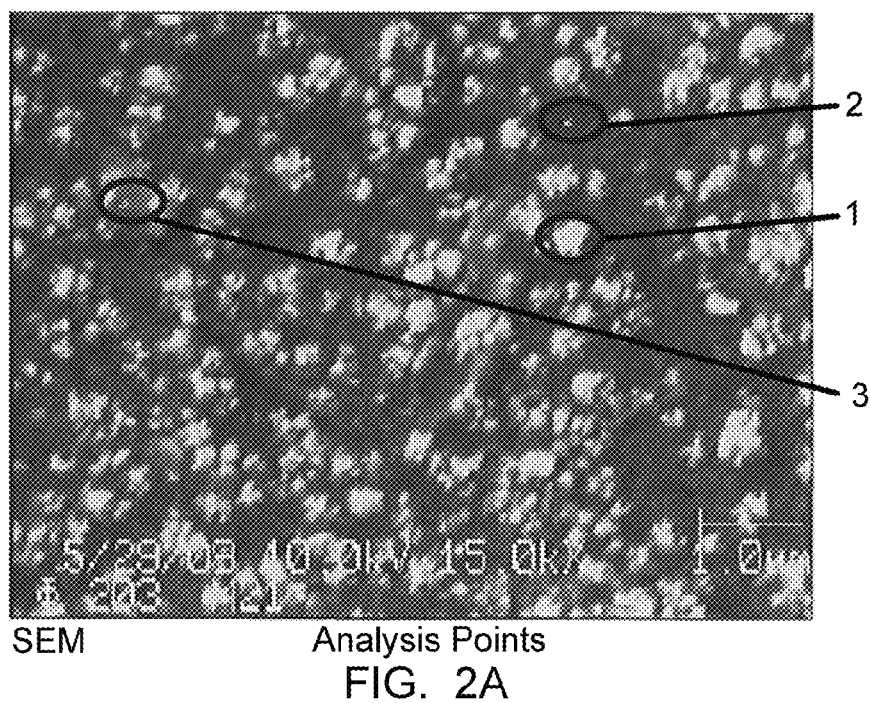
FIG. 2A is an SEM image of the sample shown in FIG. 1A with several circled areas of interest.
Figure 2B:
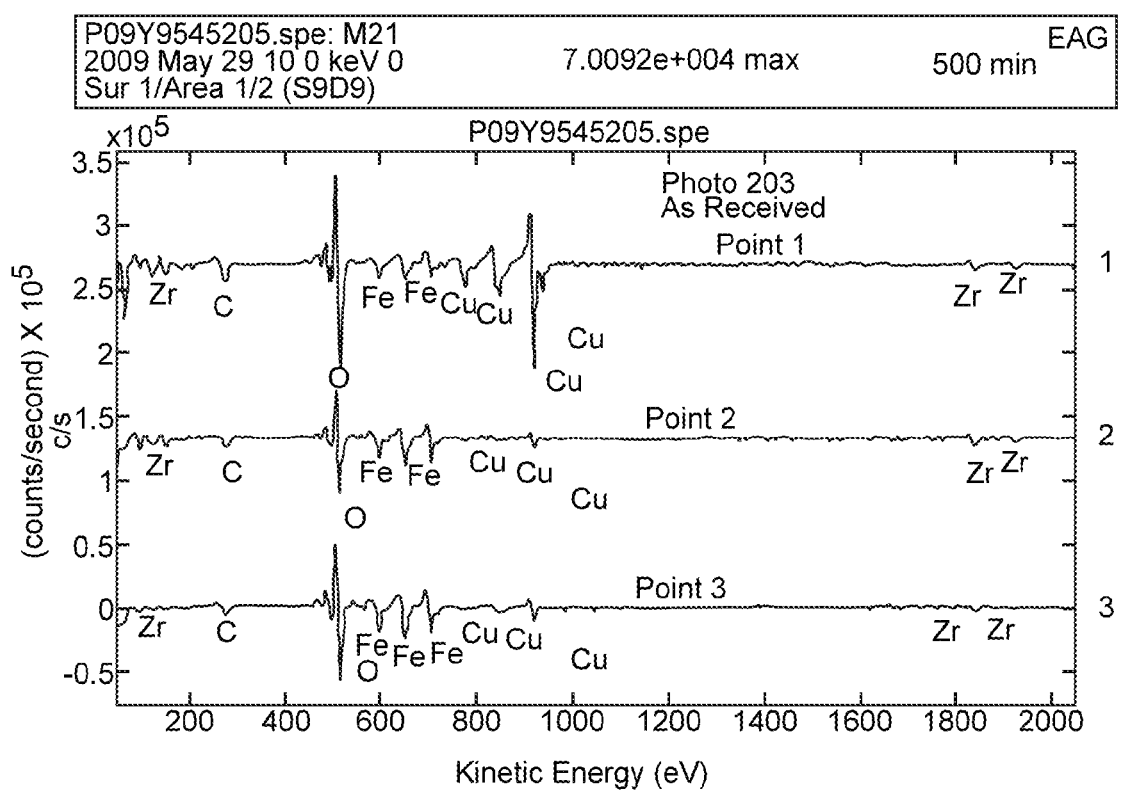
FIG. 2B is a graph of the chemical composition of the areas circled in FIG. 2A.

Sample 3:

FIGS. 2A and 2B are a further analysis of the Sample 3 surface shown in FIGS. 1A and 1C. FIG. 2A shows an SEM photograph of the pretreatment coating at a magnification of 15,000× and also shows three circles labeled 1, 2, and 3. Each of these areas was subjected to Auger Emission Spectroscopy (AES) to identify the elements and their levels found in each area of analysis. The results were evaluated by looking at the deviation from the baseline for each area, to make comparison possible the baselines were offset as can be seen. The units on the y-axis in FIG. 2B are (counts/second)×$10^5$, that is, the y-axis amounts were increased by a factor of 100,000. The results show differences in the levels of copper between the three areas. The iron, zirconium and carbon levels were all very similar in the three areas. The largest substructure, area 1, had the highest level of copper. By way of contrast area 2, a very small substructure, had very little copper in it. Finally, area 3, which was taken between two larger substructures, showed a copper level that was between areas 1 and 2. The actual levels of copper were as follows: area 1 had a copper level of 27 atomic percent; area 2 had a copper level of 5 atomic percent; and area 3 had a copper level of 6 atomic percent. This represents a pretreatment coating (Sample 3) that led to good paint adhesion as shown in TABLE 2.

Figure 3A:
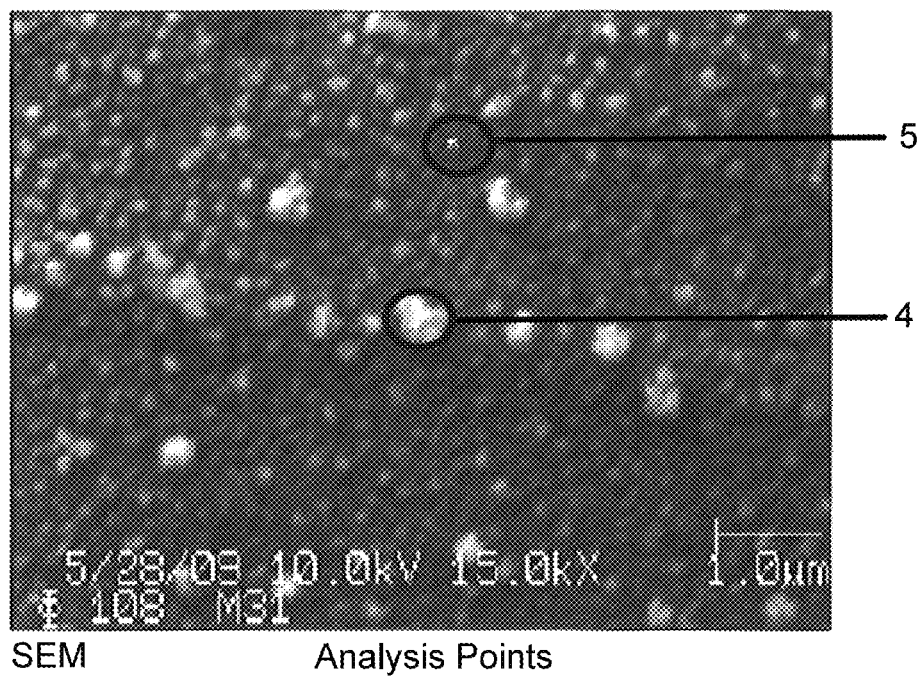
FIG. 3A is an SEM image of the sample shown in FIG. 1B with several circled areas of interest.
Figure 3B:
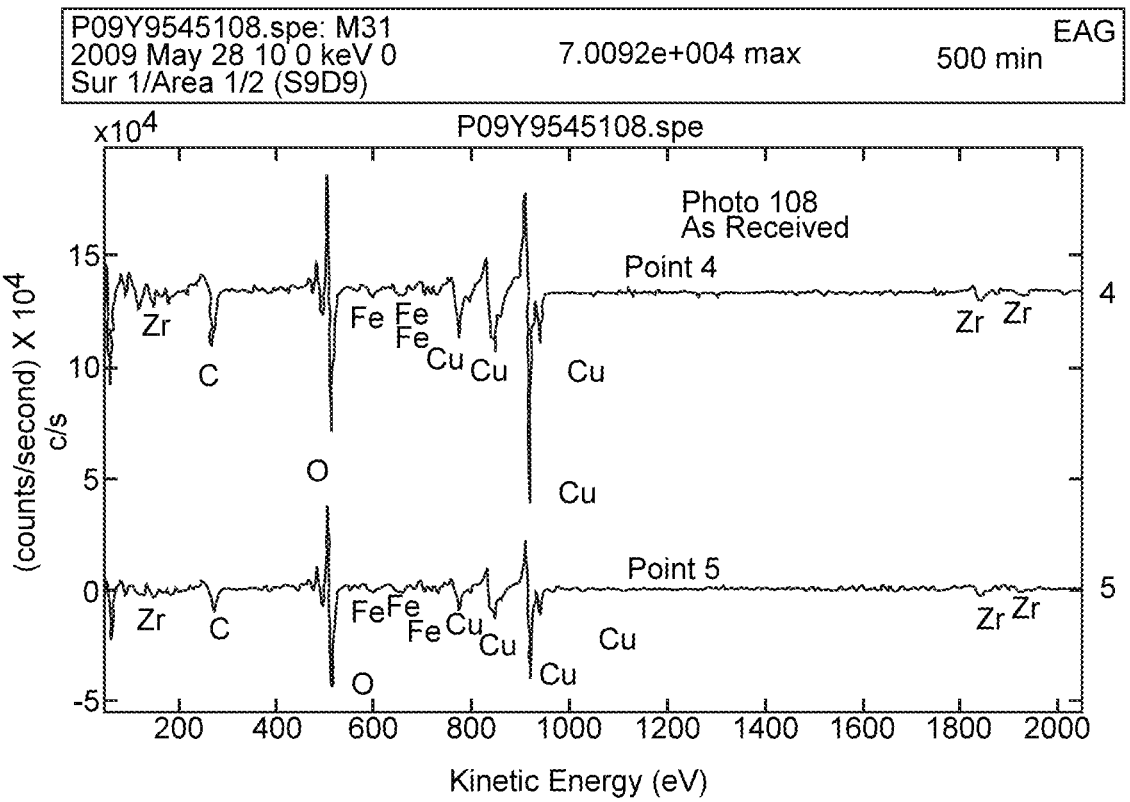
FIG. 3B is a graph of the chemical composition of the areas circled in FIG. 3A.

Sample 7:

FIGS. 3A and 3B show a further analysis of the surface shown in FIGS. 1B and 1D (Sample 7). FIG. 3A shows an SEM photograph of the pretreatment coating at a magnification of 15,000× and also shows two circles labeled 4 and 5. Each of these areas was subjected to AES to identify the elements and their levels found in each spot of analysis. The results were evaluated by looking at the deviation from the baseline for each area, to make comparison possible the baselines were offset as can be seen. The units on the y-axis of FIG. 3B are (counts/second)×$10^4$, that is, the y-axis amounts were increased by a factor of 10,000, therefore 1 unit in FIG. 3B is equal to 10 units in FIG. 2B. Area 4 is of a large substructure and the AES analysis showed that it had a very high level of copper, much higher than that found in the large substructure shown in FIGS. 2A and 2B, area 1. In addition, area 5, a small substructure showed lower levels of copper than area 4, but much higher than even area 1 of FIGS. 2A and 2B considering the differences in the units. The actual values for Sample 7, FIG. 3B, were as follows: area 4 had a copper level of 31 atomic percent and area 5 had a copper level of 25 atomic percent, much higher on average than those of Sample 3, which had good paint adhesion. These results show that excess copper in the deposited pretreatment coating caused poor paint adhesion and led to formation of larger substructures which was also not beneficial for paint adhesion. Pretreatment coatings with good paint adhesion tended to have smaller and fewer substructures and less deposited copper.

Figure 4:
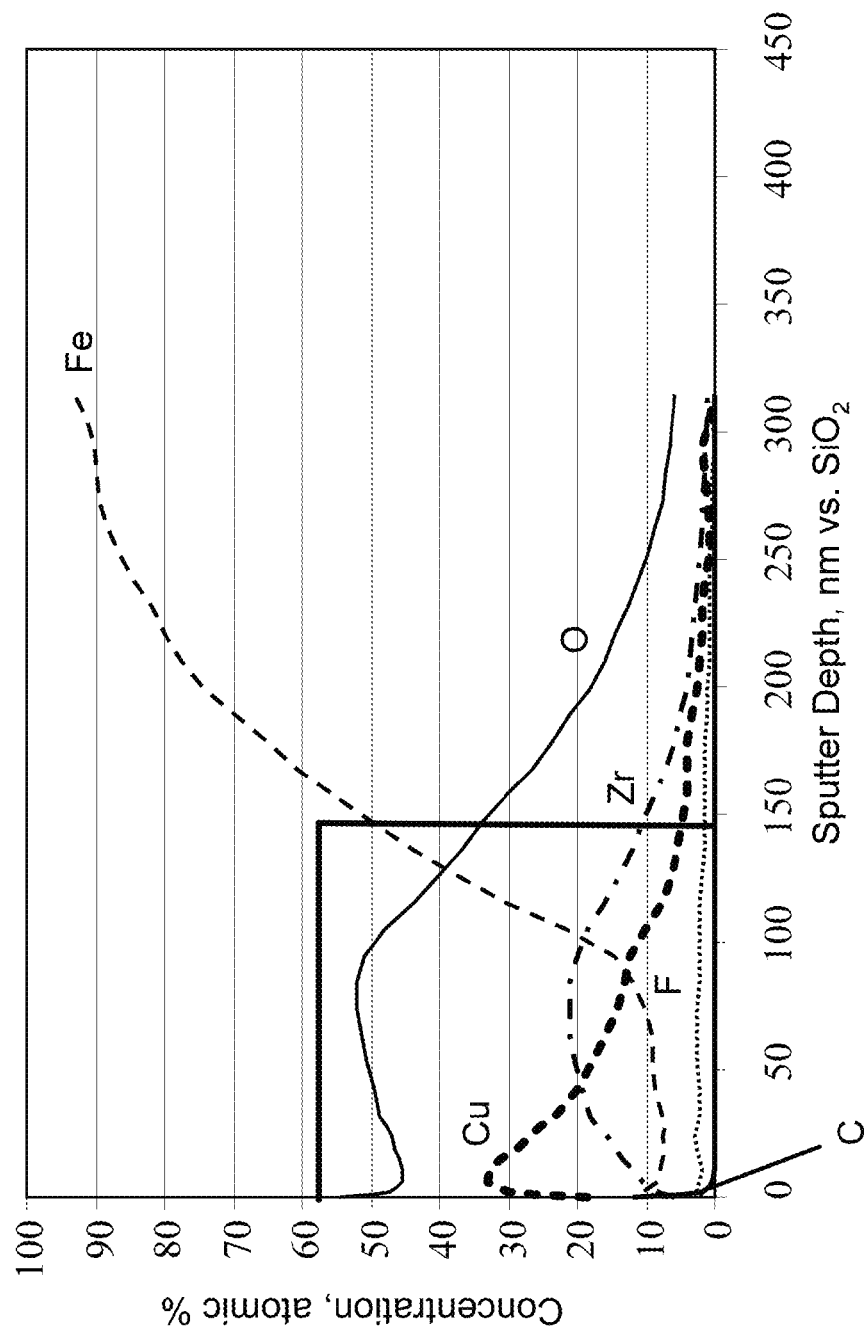
FIG. 4 is a graph of an X-ray photoelectron spectroscopy analysis of the pretreatment coating of FIG. 1A according to the invention.
Figure 5:
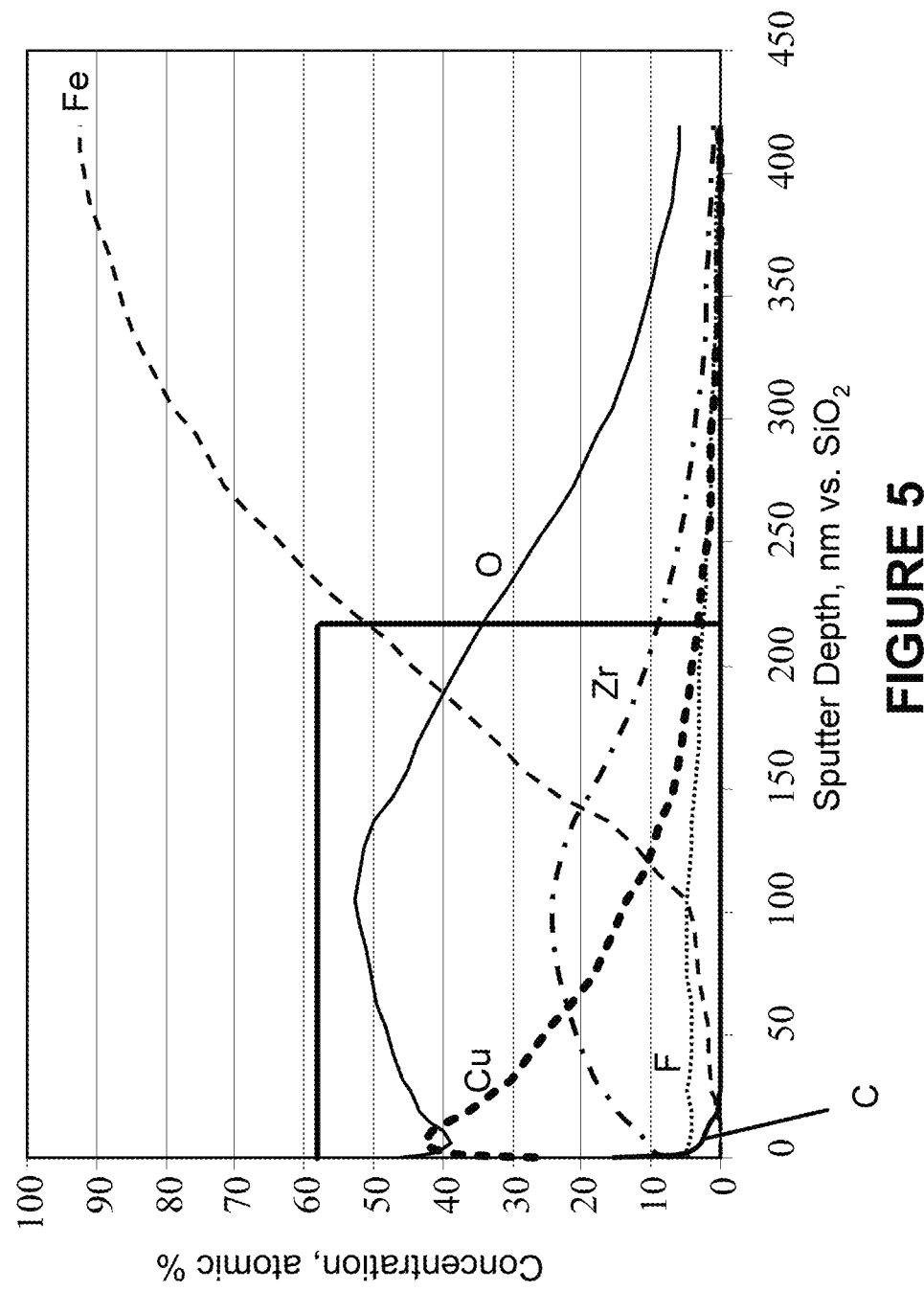
FIG. 5 is a graph of an X-ray photoelectron spectroscopy analysis of the pretreatment coating of FIG. 1B.

FIGS. 4 (Sample 3) and 5 (Sample 7) are graphical representations of the results from X-ray photoelectron spectroscopy (XPS) depth analysis of the two sample pretreatment coatings described in FIGS. 2 (Sample 3) and 3 (Sample 7), respectively. In this analysis an argon beam was used to penetrate the coating and as it moved through the coating the atomic percentages of the coating components were determined at a series of depths from the outer surface of the coating. The spot size for analysis was approximately 2×2 millimeters. Once the atomic percentage of iron (Fe) exceeded 50% the beam had reached the underlying CRS substrate. Turning to FIG. 4 (Sample 3), the box outline represents the pretreatment coating, it can be seen that the coating was approximately 145 nanometers thick while the coating of FIG. 5 (Sample 7) was approximately 220 nanometers thick. The Figures further confirmed that higher copper levels in the coating correlated to poor paint adhesion: FIG. 5, showing a graph of Sample 7, the sample exhibiting poor paint adhesion, showed that the copper levels in the deposited pretreatment coating were much higher than in Sample 3, the pretreatment coating exhibiting good paint adhesion, whose graph is shown in FIG. 4. Both the atomic percentage and the area under the curve for the copper were much greater in FIG. 5 (Sample 7) compared to FIG. 4 (Sample 3). The peak atomic % Cu in FIG. 4 (Sample 3) was 33 atomic %. The peak atomic % Cu in FIG. 5 (Sample 7) at any depth was 42.73 atomic %.

In further testing it has been determined that enhanced paint adhesion is seen when the pretreatment coating composition has sufficient chelating agent to ensure that the deposited pretreatment coating on the metal substrate has a average total ratio of the atomic % of copper to the atomic % of zirconium equal to or less than 1.1, more preferably the ratio is from 0.9 to 0.02, and most preferably from 0.3 to 0.1. This ratio is determined from the average overall atomic percentages of the Zr and Cu in the coating not from the ratio at a single depth. As can be seen in the data from FIGS. 4 (Sample 3) and 5 (Sample 7), as one moved through the coating composition down to the metal substrate the atomic percentage of the coating components varied by depth until one reached the metal substrate, so it is the total overall average atomic % ratio that must be determined. By way of contrast, the overall average total ratio of atomic % of Cu to atomic % of Zr seen in the deposited pretreatment coating composition shown in FIGS. 1B, 1D, 3, and 5 (Sample 7) was 2.73. The results led the inventors to develop the hypothesis that controlling the amount of deposited copper in the pretreatment coating, in the presence of copper in the pretreatment bath, could improve paint adhesion and also extend the pot life of zirconium-based pretreatment coatings baths, which was tested in Example 2 below.

Example 2

In Example 2, the control pretreatment coating composition was a zirconium-based coating bath, wherein the Zr level was 180 ppm, Cu was 30 ppm, total Fluoride was 400 ppm and free Fluoride was 35 ppm, the level of $SiO_2$ was 42 ppm. The test pretreatment coating composition was the same as the control and further comprising a chelating agent, tartrate introduced as tartaric acid at 50 ppm. The pH of the pretreatment coating compositions was adjusted to 4.0. The substrate was CRS that had been pre-cleaned with fresh Parco® 1533 and rinsed as described in TABLE 1 above. The immersion time in the control and the test zirconium-based coating baths was either 4 minutes or 10 minutes, simulating a shorter and a longer line stoppage. A portion of each set of samples were then further coated with BASF Cathoguard 310X as described above and baked at 375° F. The baked samples were then tested for paint adhesion as described above. In addition, the coating weights of Zr in $mg/m^2$ were determined for the samples. Finally the average atomic percentage of Zr and Cu in the pretreatment coatings was determined for each sample. The results are present below in TABLE 3.

TABLE 3

| Example | Pretreatment coating bath | Immersion time minutes | Zr coating wt. mg/m² | Average atomic % Cu | Average atomic % Zr | Ratio of Cu/Zr | Paint adhesion % remaining |
|---|---|---|---|---|---|---|---|
| Comp. Ex. 2-1 | zirconium-based coating bath | 4 | 166 | 3.8 | 3.3 | 1.15 | 90 |
| Comp. Ex. 2-2 | zirconium-based coating bath | 10 | 340 | 9.1 | 7.6 | 1.20 | 50 |
| Ex. 2-3 | zirconium-based coating bath, plus 50 ppm tartrate | 4 | 115 | 2.5 | 2.6 | 0.96 | 100 |
| Ex. 2-4 | zirconium-based coating bath, plus 50 ppm tartrate | 10 | 182 | 4.0 | 5.2 | 0.77 | 100 |

The results of Table 3 showed that an increased immersion time led to an increase in Zr coating weight, amount of Zr deposited, and the amount of Cu deposited. Inclusion of the tartrate at 50 ppm reduced the Zr coating weight, the amount of Zr deposited, and the amount of copper deposited in the pretreatment coating. More significantly, the presence of tartrate enhanced the pot life of the zirconium-based coating bath. This is seen by the fact that with tartrate present in the coating bath, the paint adhesion remains at 100% even after a 10 minute immersion, whereas in the absence of tartrate, the paint adhesion was significantly reduced to 90% or 50% of the applied paint coating. This tends to show that too much copper, relative to zirconium, deposited during the zirconium-based pretreatment coating bath can reduce paint adhesion and shorten pot life of the coating bath and that chelating agents, particularly copper metal chelators can improve paint adhesion and pot life.

Example 3

In a next series of experiments, the effect of inclusion of the metal chelator tartrate on corrosion performance was tested. Again the substrate was CRS. The CRS was treated as described below in TABLE 4. The 2 minute treatment in the zirconium-based coating immersion bath is a standard time used in the industry.

As a separate control samples of the CRS were also treated with the pretreatment coating Bonderite® 958 and sealer Parcolene® 91, both available from Henkel Adhesive Technologies per the manufacturer's directions. As a final control CRS samples were simply cleaned with Parco® Cleaner 1533R/Ridosol 1270 fresh and rinsed with no pretreatment coating. Then all the samples were coated with the BASF Cathoguard 310X, rinsed and baked.

TABLE 4

| Stage | Treatment | Product | Application | Time, seconds | Temperature ° C. |
|---|---|---|---|---|---|
| 1 | Clean | Parco ® Cleaner 1533R/Ridosol 1270 fresh | Spray | 70 | 60 |
| 2 | Clean | Parco ® Cleaner 1533R/Ridosol 1270 fresh | Immersion | 150 | 60 |
| 3 | Rinse | City water | Spray | 60 | 28 |
| 4 | Rinse | Deionized water | Spray | 60 | 25 |
| 5 | Pretreatment | zirconium-based coating bath with or without 50 ppm tartrate | Immersion | 120 or 600 | 25 |
| 6 | Pretreatment | zirconium-based coating bath with or without 50 ppm tartrate | Spray | 30 | 25 |
| 7 | Rinse | Deionized water | Spray | 60 | 25 |
| 8 | Electrodeposited coating | BASF Cathoguard 310 X | immersion | 120 | 32 (230 V) |
| 9 | Rinse | Deionized water | Spray | 30 | 25 |
| 10 | Bake electrodeposited | | | 1200 | 375° F. |

Samples were then scribed to the CRS substrate and subjected to one of two corrosion performance tests. The first test was according to ASTM B117 (Revised Dec. 15, 2007) for 500 hours. In a second test, a 31 cycle test, the sample panels were subjected to 31 cycles of a 24 hour testing protocol using a salt misting spray. The salt misting spray comprised 0.9% by weight sodium chloride, 0.1% by weight calcium chloride, and 0.075% by weight sodium bicarbonate at pH 6 to 9. The first 8 hours the panels were kept at 25° C. and 45% Relative Humidity (RH) and misted 4 times during the 8 hours at time 0, 1.5 hours, 3 hours and 4.5 hours. The panels were then put at 49° C. and 100% RH for the next 8 hours with a ramp up from 25° C. to 49° C. and 100% RH over the first hour. The final 8 hours were at 60° C. and less than 30% RH with a ramp to the new conditions of 3 hours. The cycle was carried out for a total of 31 times. The panels were then evaluated for average creep and maximum creep in millimeters from the scribe line. The results for the ASTM B117 test are presented in TABLE 5. The results for the 31 cycle corrosion test are presented in TABLE 6.

TABLE 5

ASTM B117

| Pretreatment | Maximum Corrosion creep, millimeters | Average Corrosion creep, millimeters |
|---|---|---|
| zirconium-based coating bath, 2 minutes | 9 | 3.9 |
| zirconium-based coating bath, 10 minutes | 3.5 | 2.5 |
| zirconium-based coating bath, 2 minutes, 50 ppm tartrate | 6 | 3 |
| zirconium-based coating bath, 10 minutes, 50 ppm tartrate | 3 | 1.9 |
| Bonderite ® 958/ Parcolene ® 91 | 2 | 1.3 |

TABLE 6

31 Cycle Corrosion Test

| Pretreatment coating | Maximum Corrosion creep, millimeters | Average Corrosion creep, millimeters |
|---|---|---|
| Clean only | 11 | 10.4 |
| zirconium-based coating bath, 2 minutes | 3.8 | 3.1 |
| zirconium-based coating bath, 10 minutes | 5.3 | 4.3 |
| zirconium-based coating bath, 2 minutes, 50 ppm tartrate | 4.2 | 3.6 |
| zirconium-based coating bath, 10 minutes, 50 ppm tartrate | 4.5 | 3.8 |
| Bonderite ® 958/ Parcolene ® 91 | 2.2 | 2.2 |

The results indicate that inclusion of the tartrate did not have a negative effect on the ability of the zirconium-based pretreatment coating to provide corrosion resistance to the CRS. Under the ASTM 8117 500 hour test the results of using the tartrate were at least as good as the standard zirconium-based coating bath and were slightly better for extended dwell time of the CRS in the bath evidencing the improved pot life from the chelator. The longer immersion times did not reduce the corrosion protection and may even increase it. In the 31 cycle test the benefit of using a pretreatment coating was shown, in the clean only sample there was much more corrosion than in any of the pretreatment coating examples. The presence or absence of the tartrate did not seem to affect the corrosion protection ability of the pretreatment coating. These results are important because if the presence of a chelating agent, such as the tartrate, was detrimental to the corrosion protection then one would have to balance that negative effect against the beneficial effect on paint adhesion.

Example 4

In a next series of experiments the effects of another chelating agent, triethanolamine (TEA), were tested. The substrate was CRS and the pretreatment coating and BASF Cathoguard were applied as described below in TABLE 7. Again the zirconium-based coating bath included 180 ppm of Zr, 30 ppm of Cu, 35 ppm of free and 400 ppm total Fluoride and 42 ppm of $SiO_2$. Samples were then tested for Zr coating weight in $mg/m^2$, paint adhesion, and corrosion protection under ASTM B117 for 500 hours. As a control samples were also prepared with a pretreatment coating of Bonderite® 958 and Parcolene® 91 as described in Example 3. The results are presented below in TABLE 8. Only a single concentration of TEA was tested, the same level as used for tartrate of 50 ppm.

TABLE 7

| Stage | Treatment | Product | Application | Time, seconds | Temperature ° C. |
|---|---|---|---|---|---|
| 1 | Clean | Parco ® Cleaner 1533R/Ridosol 1270 fresh | Spray | 70 | 60 |
| 2 | Clean | Parco ® Cleaner 1533R/Ridosol 1270 fresh | Immersion | 150 | 60 |
| 3 | Rinse | City water | Spray | 60 | 28 |
| 4 | Rinse | Deionized water | Spray | 60 | 25 |
| 5 | Pretreatment | zirconium-based coatings bath with or without 50 ppm TEA | Immersion | 240 or 600 | 25 |
| 6 | Pretreatment | zirconium-based coating bath with or without 50 ppm TEA | Spray | 30 | 25 |

TABLE 7-continued

| Stage | Treatment | Product | Application | Time, seconds | Temperature ° C. |
|---|---|---|---|---|---|
| 7 | Rinse | Deionized water | Spray | 60 | 25 |
| 8 | Electrodeposited coating | BASF Cathoguard 310 X | immersion | 120 | 32 (230 V) |
| 9 | Rinse | Deionized water | Spray | 30 | 25 |
| 10 | Bake electrodeposited paint | | | 1200 | 375° F. |

TABLE 8

| Pretreatment (ND = not determined) | Zr coating weight mg/m² | Paint adhesion % remaining | Maximum creep millimeters | Average creep millimeters |
|---|---|---|---|---|
| zirconium-based coating bath, 4 minute immersion | 122 | 60 | 9 | 3.9 |
| zirconium-based coating bath, 10 minute immersion | 202 | 50 | 3.5 | 2.5 |
| zirconium-based coating bath, plus 50 ppm TEA, 4 minute immersion | 115 | 98 | 11.8 | 8.8 |
| zirconium-based coating bath, plus 50 ppm TEA, 10 minute immersion | 231 | 90 | 4.8 | 3.3 |
| Bonderite ® 958/Parcolene ® 91 | 0 | ND | 2.0 | 1.3 |

The results again demonstrate the benefit of including a chelating agent, in particular a copper metal chelator, in the pretreatment coating on the paint adhesion. In the presence of 50 ppm of TEA the paint adhesion was significantly enhanced, even with a long immersion of 10 minutes. The results show that at this level of TEA there was a negative effect on corrosion protection. Clearly, the optimum level of copper metal chelator is dependent on the identity of the chelator. There was also no reduction of Zr coating weight with TEA at 50 ppm.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. An article of manufacture comprising a coated metal substrate which has been coated according to a method comprising steps of:
 a) contacting a metal substrate with a pre-rinse comprising a copper chelating agent, and optionally copper, prior to application of a zirconium-based pretreatment coating composition to the metal substrate;
 b) applying to the metal substrate a zirconium-based metal pretreatment coating composition comprising dissolved Zr, a source of fluoride, optionally materials comprising one or more of silicon, boron and yttrium and optional added dissolved Cu, thereby forming a pretreatment coating on the metal substrate;
 wherein the copper chelating agent is present in the pre-rinse in an amount sufficient to control the amount of copper deposited onto the metal substrate by the zirconium-based pretreatment coating composition such that an average total ratio of atomic % of Cu to atomic % of Zr in the pretreatment coating deposited on the metal substrate is in a range of 0.0001 and 1.1.

2. The article of manufacture according to claim 1, wherein the average total ratio of atomic % of Cu to atomic % of Zr in the pretreatment coating on the metal substrate is about 0.9 to 0.02.

3. The article of manufacture according to claim 1, wherein the average total ratio of atomic % of Cu to atomic % of Zr in the pretreatment coating on the metal substrate is about 0.3 to 0.1.

4. The article of manufacture according to claim 1, wherein atomic % of Cu in said pretreatment coating measured at a series of depths from an outer surface of the pretreatment coating to the metal substrate does not exceed 33 atomic % Cu at any of said depths.

5. The article of manufacture according to claim 1, wherein the metal substrate comprises cold rolled steel.

6. The article of manufacture according to claim 5, further comprising at least one paint applied to the pretreatment coating resulting in a painted coated substrate that achieves at least 95% paint remaining when tested according to ASTM 3330M (Revised Oct. 1, 2004).

7. The article of manufacture according to claim 5, further comprising at least one paint applied to the pretreatment coating resulting in a painted coated substrate that achieves 1.9 mm or less average corrosion creep when tested according to ASTM B117 (Revised Dec. 15, 2007) for 500 hours.

8. An article of manufacture comprising a coated metal substrate comprising: a metal substrate; and deposited on said metal substrate, a pretreatment coating comprising metal from said substrate, zirconium, oxygen, copper, and optional elements fluorine and carbon; wherein the pretreatment coating on the metal substrate has an average total ratio of atomic % of Cu to atomic % of Zr that is equal to or less than 1.1.

9. The article of manufacture according to claim 8, wherein the average total ratio of atomic % of Cu to atomic % of Zr in the pretreatment coating deposited on the metal substrate that is in a range of 0.0001 and 1.1.

10. The article of manufacture according to claim 8, wherein the average total ratio of atomic % of Cu to atomic % of Zr in the pretreatment coating on the metal substrate is about 0.9 to 0.02.

11. The article of manufacture according to claim 8, wherein the average total ratio of atomic % of Cu to atomic % of Zr in the pretreatment coating on the metal substrate is about 0.3 to 0.1.

12. The article of manufacture according to claim 8, wherein the elements fluorine and carbon are present in the pretreatment coating and wherein atomic % of Cu in said pretreatment coating measured at a series of depths from an outer surface of the pretreatment coating to the metal substrate does not exceed 33 atomic % Cu at any of said depths.

13. The article of manufacture according to claim 8, wherein the metal substrate comprises cold rolled steel.

14. The article of manufacture according to claim 13, further comprising at least one paint applied to the pretreatment coating resulting in a painted coated substrate that achieves at least 95% paint remaining when tested according to ASTM 3330M (Revised Oct. 1, 2004).

15. The article of manufacture according to claim 13, further comprising at least one paint applied to the pretreatment coating resulting in a painted coated substrate that achieves 1.9 mm or less average corrosion creep when tested according to ASTM B117 (Revised Dec. 15, 2007) for 500 hours.

\* \* \* \* \*